(12) United States Patent
Abbas et al.

(10) Patent No.: US 8,392,919 B2
(45) Date of Patent: *Mar. 5, 2013

(54) RUNTIME ENVIRONMENT FOR VIRTUALIZING INFORMATION TECHNOLOGY APPLIANCES

(75) Inventors: Ahmed Abbas, Nasr (EG); Helmut Weber, Dettenhausen (DE); Kristiann J. Schultz, Chatfield, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/418,697

(22) Filed: Mar. 13, 2012

(65) Prior Publication Data

US 2012/0174115 A1   Jul. 5, 2012

Related U.S. Application Data

(63) Continuation of application No. 12/369,495, filed on Feb. 11, 2009.

(51) Int. Cl.
*G06F 9/455* (2006.01)
*G06F 9/46* (2006.01)

(52) U.S. Cl. .......................................................... 718/1
(58) Field of Classification Search .................... None
See application file for complete search history.

(56) References Cited

U.S. PATENT DOCUMENTS

| | | | |
|---|---|---|---|
| 7,478,173 B1 * | 1/2009 | Delco | 709/250 |
| 2005/0132365 A1 * | 6/2005 | Madukkarumukumana et al. | 718/1 |

* cited by examiner

*Primary Examiner* — Corey S Faherty
(74) *Attorney, Agent, or Firm* — Patents on Demand P.A.; Brian K. Buchheit; Scott M. Garrett

(57) ABSTRACT

A system for virtualizing information technology (IT) appliances can include an IT appliance hosting facilities software. The IT appliance hosting facilities software can be implemented at a layer of abstraction above a virtual machine host, which is implemented in a layer of abstraction above a hardware layer of a computing system. The IT appliance hosting facilities software can include programmatic code functioning as virtualized hardware upon which a set of IT appliance software modules are able to concurrently run. The IT appliance hosting facilities software can provide caching, application level security, and a standardized framework for running the IT appliance software modules, which are configured in conformance with the standardized framework.

6 Claims, 4 Drawing Sheets

RUNTIME ENVIRONMENT FOR VIRTUALIZING INFORMATION TECHNOLOGY APPLIANCES

CROSS-REFERENCE TO RELATED APPLICATIONS

This application is a continuation of U.S. patent application Ser. No. 12/369,495, filed Feb. 11, 2009 (pending), which is incorporated herein in its entirety.

BACKGROUND

The present invention relates to the field of software virtualization and, more particularly, to a runtime environment for virtualizing information technology (IT) appliance servers.

The total cost of ownership (TCO) of traditional information technology infrastructure has been continuously increasing. This is due to the complexity of the underlying software stacks and consequently their demand for computing power as well as operational requirements. IT appliances are often proposed as a solution to solve a part of this problem by providing specialized hardware which handles infrastructure tasks. For instance, a network appliance can provide file sharing between two or more virtual private networks.

Maintaining these appliances, however, remains a challenge in terms of hardware upgrades and/or failures. Upgrades/failures can usually result in costly appliance replacement and/or significant downtime. These drawbacks can considerably increase the TCO of the entire infrastructure. Further, each conventional appliance serves a specific set of functions. That is, each appliance is optimized hardware and software for a discrete set of functions, as opposed to a generalized computing device, that by design is able to perform different functions depending upon loaded software. It is often unfeasible or impossible to repurpose an IT appliance when infrastructure changes render that IT appliance unnecessary. Accordingly, while IT appliances provide many advantages, several shortcomings can adversely affect the TCO of IT appliances.

DETAILED DESCRIPTION

Figure 1:
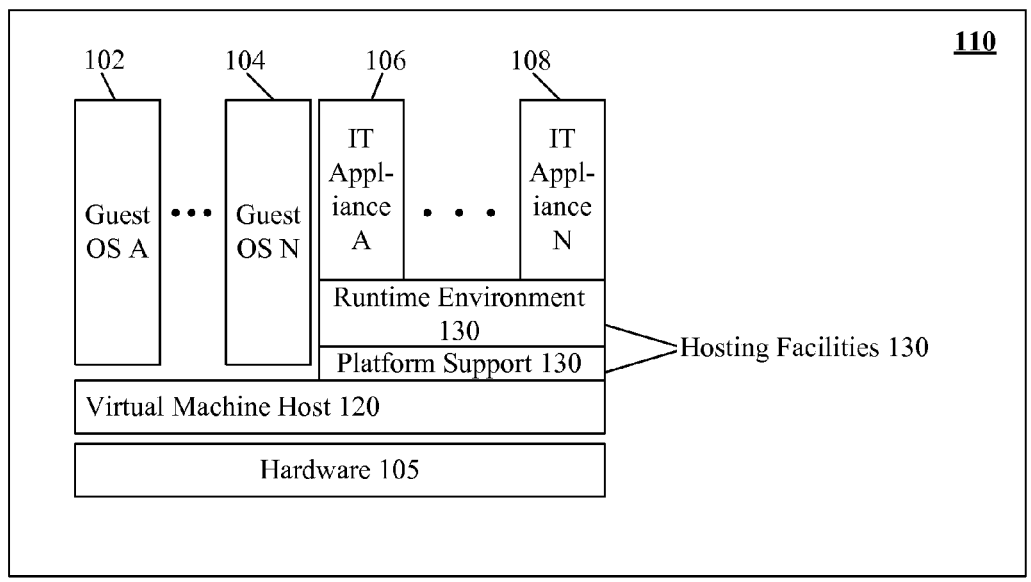
FIG. 1 is a schematic diagram illustrating a system for virtualizing information technology (IT) appliances utilizing hosting facilities in accordance with an embodiment of the inventive arrangements disclosed herein.
Figure 1:
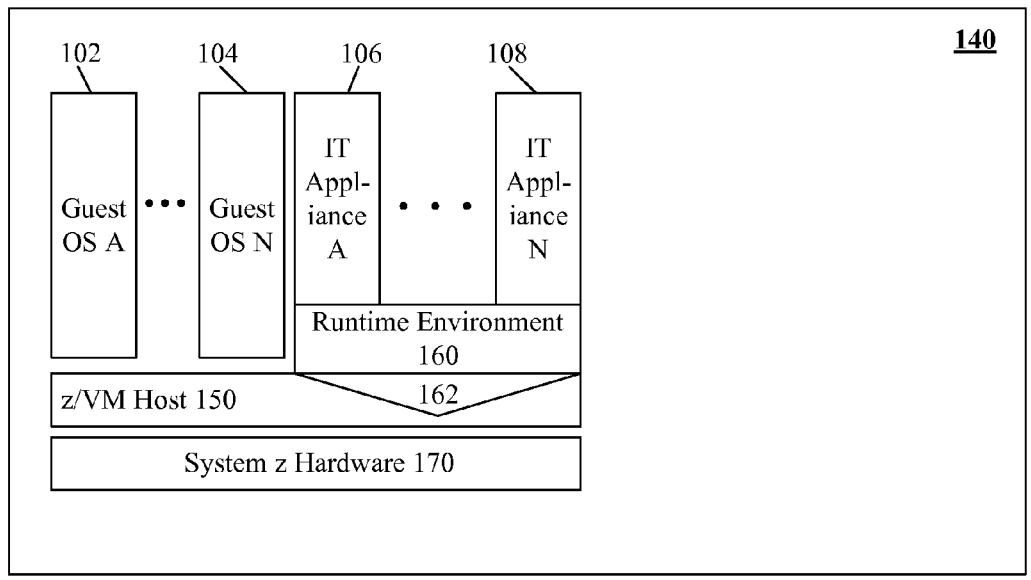

The present invention discloses a solution for a runtime environment for virtualizing information technology (IT) appliance. In one embodiment, for example, the framework can implement IT appliances over z/VM using special purpose operation systems. In the solution, a runtime environment can be used to host appliances within a computing platform. Utilizing existing hosting facilities, the runtime environment can communicate with the computing platform hardware. The environment can provide a framework for enabling appliance virtualization while allowing common functionality to be performed. The framework can include an application programming interface (API), software development tools, and the like. Abstracted host facilities can enable deployed appliances to communicate with generic components including, but not limited to, communications components, resource managers, security mechanisms, and the like. The virtualization of the appliance can be transparent to users, administrators, and/or other computing environment components with which a virtualized IT appliance interacts.

The disclosed solution is believed to be superior to existing techniques in numerous ways. Depending upon implementation specifics of a particular embodiment of the disclosed solutions, that embodiment can:

(1) reduce the cost of releasing and maintaining software products on different platforms;
(2) extend the business value of existing customer investment in SYSTEM Z (or other computing system enhanced for IT appliance virtualization) and reduce total cost of ownership (TCO) of such IT appliances;
(3) extend customer business model by provide appliance functionality as a service to be available to other customers on demand using existing infrastructure with controlled resource allocation and service level agreement (SLA);
(4) enhance product serviceability and distribution by providing it as a software that is hosted on a smaller software stack rather than a general purpose operating systems or a special hardware;
(5) utilize provisioning and failover mechanisms that are used for other software components to introduce new upgrades and enhance overall system resilience and availability;
(6) ease of scalability by either allocating additional system resources or creating new appliance instances, as needed;
(7) empower these IT appliances by the underlying infrastructure (e.g., SYSTEM Z) by native communication with other system resources and facilities, as well as interactions with external hardware, such as storage and network interfaces;
(8) enable common functionality, such as administration, caching and security, to be shared among different types and instances of appliances by providing a layer of these services above what is offered by the z/VM level (or an equivalent level of a different computing system enhanced for IT appliance virtualization); and/or
(9) simplify appliance implementation by utilizing a range of different levels of programming languages that can be used to implement software over z/VM (or other computing system enhanced for IT appliance virtualization), as well as the Language Environment and debugging facility as opposed to using lower level language for hardware firmware programming.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, for instance, via optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a schematic diagram illustrating a system 110,140 for virtualizing information technology (IT) appliances utilizing hosting facilities in accordance with an embodiment of the inventive arrangements disclosed herein. In system 110, a set of hosting facilities 130 can be used to permit IT appliances 106-108 to be virtualized. The virtualized appliances 106-108 can be executed simultaneously and within the same virtual machine host 120 executing on hardware 105.

In one embodiment, shown by system 140, the system that virtualizes IT applications can execute a set of hosting facilities 160-162 within SYSTEM Z hardware 170. The hosting facilities 160-162 can operate cooperatively within a z/VM host 150. Existing platform support 162 can communicate with runtime 160 enabling IT appliance 106-108 to be virtualized. In another embodiment, the hardware 105 can be any platform having a hypervisor (virtual machine host) 120, which has been extended by the hosting facilities 130 to support virtualized IT appliances 106, 108. Further, the facilities 130 can be standardized across multiple platforms, so that a virtualized IT appliance 106, 108 can execute on different hardware 105 and/or using different virtual machine hosts 120.

As used herein, appliances 106-108 can be one or more set of programmatic instructions specialized to perform a set of tasks and/or functions. Operating systems associated with appliances can be platforms with dedicated functionality specific to the appliance. Functionality can be restricted to minimal core operations including, but not limited to, communication functionality, application hosting, storage procedures, and the like. In one embodiment, appliances 106-108 can lack a generalized operating system platform, which can be supplemented using facilities 130. In one embodiment, the virtualized appliances 106, 108 can be, from an external perspective, identical to an equivalent IT appliance that has not been virtualized.

In system 110, 140, operating systems 102, 104 can be instanced into logical partitions within a virtual hosting layer 120, 150. Logical partitions 102-104 can communicate in real-time or near real-time through facilities provided by hosting layer 120, 150. Similarly, appliance 106, 108 can be deployed onto system 110, 140 utilizing hosting facilities 130, 160, 162. Host facilities 130, 160, 162 can provide caching, application level security and a common system management framework which can be extended by IT appliance vendors. The facilities 130, 160, 162 can enable the common management framework to present a consistent user experience across deployed appliances.

In system 110, hosting facilities 130 can provide virtualization for a set of IT appliances 106-108. Appliances 106-108 can execute concurrently with other virtualized operating systems 102-104. Communication between operating systems 102-104 and appliances 106-108 can occur in real-time or near real-time, enabling appliances to behave identical to non-virtualized appliances. Hosting facilities 130 can be implemented as a single layer providing a runtime environment and a platform support layer.

Facilities 130 can enable virtualized appliances 106-108 to scale with enterprise requirements. Facilities 130 can allow appliances 106-108 to be configured for clustering, pooling configurations, failover support, and the like. For instance, appliance 106 can be grouped into a pool of non-virtualized appliances serving as a resource pool. Further, facilities 130 can permit failover support for virtualized appliances through shared services available to all virtualized appliances.

System 140 can represent a specific implementation of system 110, comprising of SYSTEM Z hardware 170 and z/VM virtual host 150 environment. In system 140, hosting facilities 160-162 can be optionally separate cooperating layers. Environment 160 can be a virtualization layer executing simultaneously with platform support 162. Platform support layer 162 can be a z/VM host 150 provided layer. Existing components and/or services within host 150 layer can be provided to environment 160 as platform support 162, enabling IT appliance virtualization. In one embodiment, facilities 160-162 can be integrated into IBM WEBSPHERE APPLICATION SERVER, WEBSPHERE PORTAL, and the like.

Appliance runtime 160 can enable appliances 106-108 to execute as virtualized appliances within a SYSTEM Z platform. Appliances 106-108 can function identical to non-virtualized appliances, performing appliance specific tasks through native communication mechanisms. For instance, clients being served by appliance 108 can be unaware of the appliance virtualization.

Platform support 162 can provides services to be invoked by the Appliance Runtime components. While appliance runtime 160 components can use existing services provided by the z/VM host 162 which can simplify implementation requirements and assist in backward compatibility with existing operational customer environments. That is, depending on the evolution of the appliance runtime 160 components, the platform support 162 can require additions to z/VM host 150 layer. Platform support 162 layer can be grouped together which can be used as a software prerequisite for appliance virtualization. Platform support 162 can be used to identify versions of z/VM 150 which can support appliance hosting and versions which cannot.

Separation of appliance runtime 160 and platform support 162, appliance host facilities can be portable across different host operating systems. That is, different implementations of the appliance runtime 160 can provide the same interfaces to appliances with different underlying platforms. For instance, platform 162 separation can allow for compatibility across different versions. Portability affords appliance vendors to rigorously test appliances before deployment.

Drawings presented herein are for illustrative purposes only and should not be construed to limit the invention in any regard. Appliances 106-108 can communicate with virtual host components 120, 150 which can be separate from platform support 130, 162.

Figure 2:
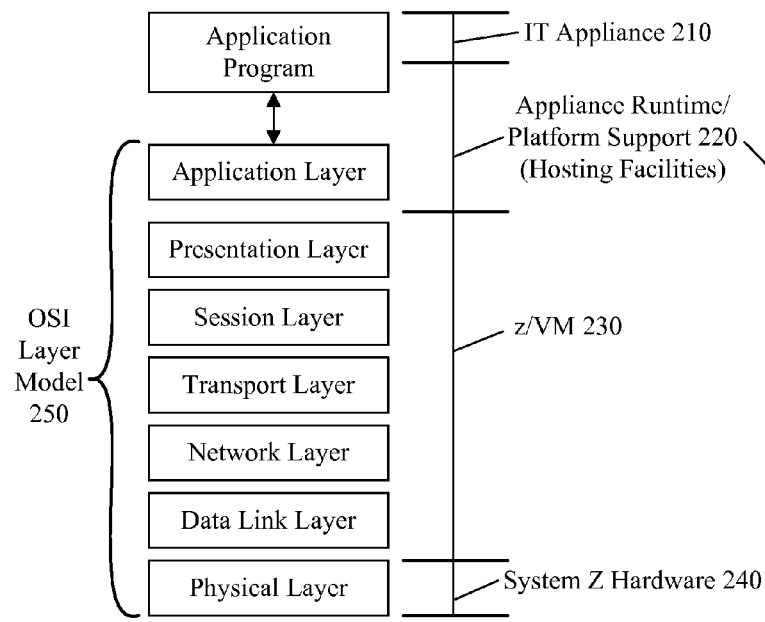
FIG. 2 is a schematic diagram illustrating a framework for performing IT appliance virtualization in accordance with an embodiment of the inventive arrangements disclosed herein.
Figure 2:
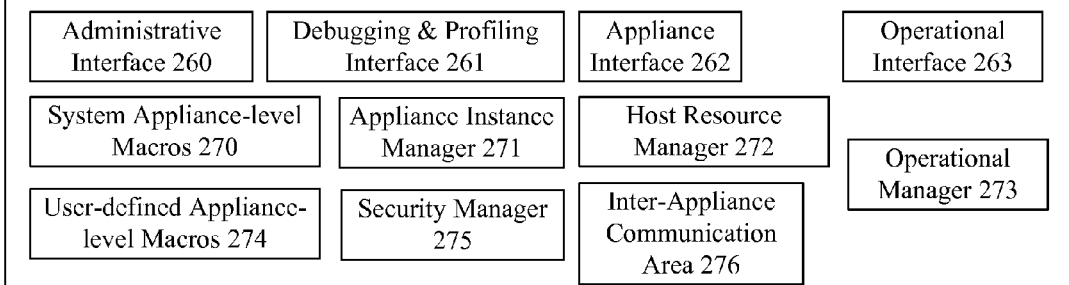
Figure 2:
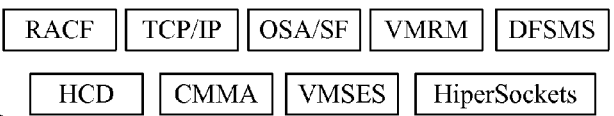

FIG. 2 is a schematic diagram illustrating a framework 220 for performing IT appliance virtualization in accordance with an embodiment of the inventive arrangements disclosed herein. In FIG. 2, framework 220 can be mapped to an Open Systems Interconnection (OSI) layer model 250. The model 250 can illustrate the structure of framework 220 spanning an execution environment to allow information technology (IT) appliance virtualization.

IT appliance 210 can correlate to an application program entity executing within the application layer of the model 250. Appliance 210 can include a virtualized appliance, an appliance instance, and the like. As used herein, appliance runtime 220A and platform support 220B can be referred to collectively as hosting facilities 220. Runtime 220A can include, but are not limited to, one or more interfaces, system and user-defined macros, resource managers, operational managers, and the like. Platform support 220B can include, but is not limited to, resource access control facilities (RACF), connectivity services (e.g. TCP/IP), virtual machine components/services, and the like.

The appliance runtime 220A can abstract host system operational details and permit consuming appliances to interact with the host system through an interface. The appliance runtime 220A can lack ownership of resources which can be accessed through a host operating system. The interfaces can include, but are not limited to an administrative interface, a debugging and profiling interface, an appliance interface, an operational interface, and the like.

The administrative interface 260 can give administrative access to one or more appliance host facility components. The interface 260 can provide access to system management which can include a console enabling system configuration. The console can be a command line interface, graphical user interface, multi-modal interface, and the like. Interface 260 can enable appliances to be deployed, undeployed, activated, deactivated, instantiated, and the like.

The debugging and profiling interface 261 can allow appliance developers to debug executable code during runtime. Profiling activities such as resource management can be performed during the runtime execution. The interface 261 can be cooperatively utilized and/or integrated with development tools enabling a uniform development process. For example, resource usage reports can be presented within an integrated development environment (IDE) when an appliance is being debugged.

The appliance interface 262 can allow appliance instances to access system resources during runtime. Resources can include, but are not limited to, memory, processor time, peripherals, storage, and the like. Appliance interface 262 can enable deployed appliance instances to interact with underlying system 340 and/or virtual hosting layers (e.g. z/VM 330).

Operational interface 263 can permit appliances to perform operational tasks provided through the operational manager component 273. Tasks can include backup services, diagnostic report submission, and the like. For instance, automated backup services can be executed through interface 263.

Marcos 270, 274 can be a simple set of instructions invoked by one or more interfaces to perform specific functions. Macros 270, 274 can be provided to appliances enabling rapid execution of determined instruction sets. Macros 270, 274 can include system appliance-level macros allowing basic functionality to be provided and user-defined macros permitting custom functionality. For instance, macros 270, 274 can be utilized to enable appliances to reading a file from a storage medium. User-defined macros can enable developers to establish complex instruction sets which can be deployed through administrative interface 260.

Appliance instance manager 271 can control the life cycle of appliance instances during runtime. Manager 271 can read configuration parameters which have been set through the administrative interface and allocate resources using host resources manager 272. Manger 271 can provide appliance clustering capabilities where appliances are not able to implement clustering at an application level. For example, WEBSPHERE APPLICATION SERVER clustering can rely on the clustering capabilities provided by host facilities 220 instead of the native implementation.

Security manager 275 can handle which appliances and/or appliance instances can access system components 220B, 230, 240. Manager 275 can collaborate with instance manager 271 to permit each instance acquire an appropriate amount of system resources. Security permission carried out by manager 275 can be configured through administrative interface 260 and can be validated with each invocation through the appliance interface 262. In one embodiment, security manager 275 can lack rely on the host operating system to track security policies and principles.

The inter-appliance communication area 276 can be a virtual memory area allowing appliances to share data and communicate. The area 276 can be a virtualized memory space which can exist physically on the host machine 230, 240. Similar to resources used from the host the area 276 memory allocation can be performed by host resources manager 272.

Host resources manager 272 can manage resources used from the host system 230, 240. Manager 272 can provide access and manage the use of memory, storage, processing time, peripherals, and the like. Unlike other system 220A components, manager 272 can be highly dependent on the host system 230, 240.

Operational manager 273 can provide operational services to the host facilities 220 and hosted appliances 210. Services can include, but are not limited to, backup services, first failure data capture, diagnostic report submission, automated system updates, and the like. The services can utilize connectivity infrastructure of the host operating system. Operational manager 273 can be an optional component which can be excluded from development environments.

Drawings presented herein are for illustrative purposes only and should not be construed to limit the invention in any regard. Implementation details of hosting facilities 220 can vary based on system 230, 240 requirements and/or capabilities. Platform support 220B can be a SYSTEM Z specific implementation of hosting facilities and components can differ from executed embodiments.

Figure 3:
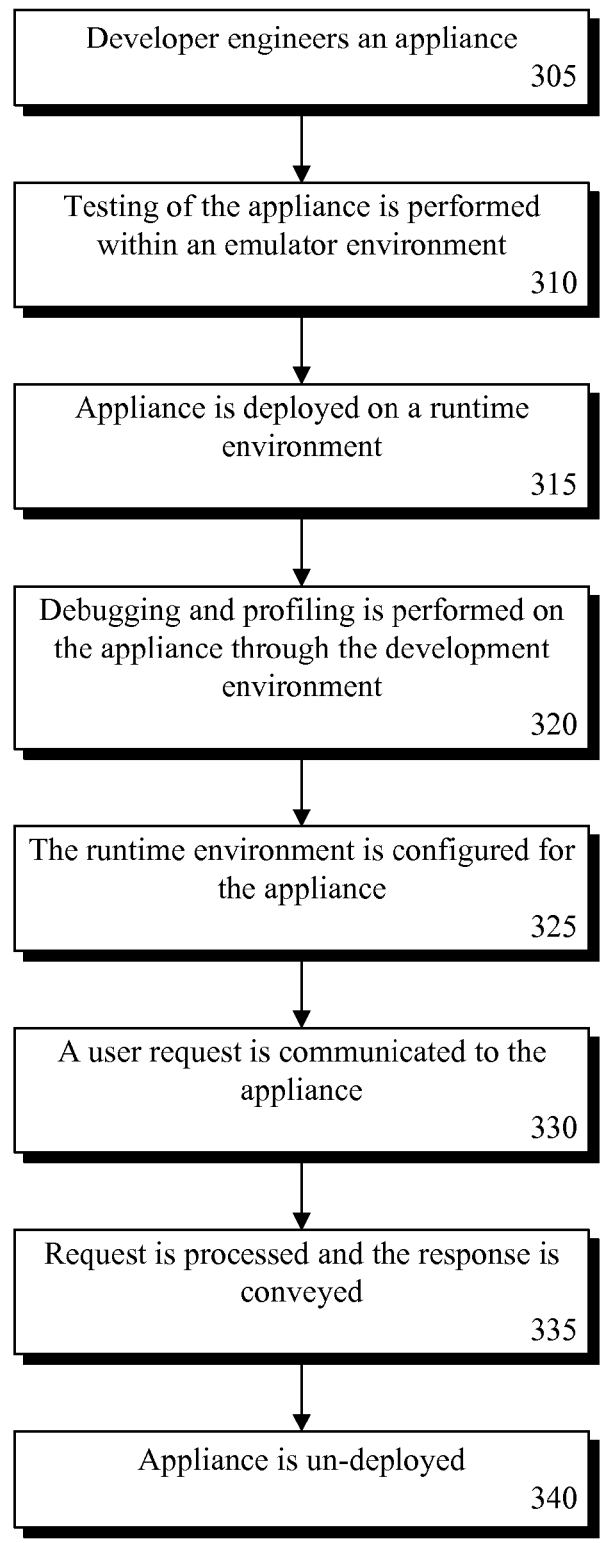
FIG. 3 is a schematic diagram illustrating a method for developing and virtualizing an IT appliance in accordance with an embodiment of the inventive arrangements disclosed herein.

FIG. 3 is a schematic diagram illustrating a method 300 for developing and virtualizing an information technology (IT) appliance in accordance with an embodiment of the inventive arrangements disclosed herein. Method 300 can be performed in the context of system 100. In method 300, a virtualized appliance can be developed and deployed on a set of virtualization hosting facilities.

In step 305, a developer can engineer an IT appliance which can be executed within a virtualized environment. The appliance can be deployed within a virtualized environment with minimal configuration changes. Optionally, the environment can be configured to permit execution of the appliance. In step 310, the engineered appliance can be tested within an emulator environment. The virtualized environment can be emulated within a development environment such as an Integrated Development Environment (IDE). In step 315, the appliance can be deployed on a runtime environment which can be identical to the emulated environment. Deployment can be facilitated by one or more hosting facility interfaces such as an appliance interface. In step 320, debugging and profiling can be performed on the appliance through the development environment. In step 325, the runtime environment can be optionally configured for the appliance. In step 330, a user request can be communicated to the deployed appliance. In step 335, the request can be processed and an appropriate response can conveyed. In step 340, the appliance can be optionally un-deployed. As such, un-deployment configurations can include the ability for the appliance can be deactivated or removed.

Figure 4:
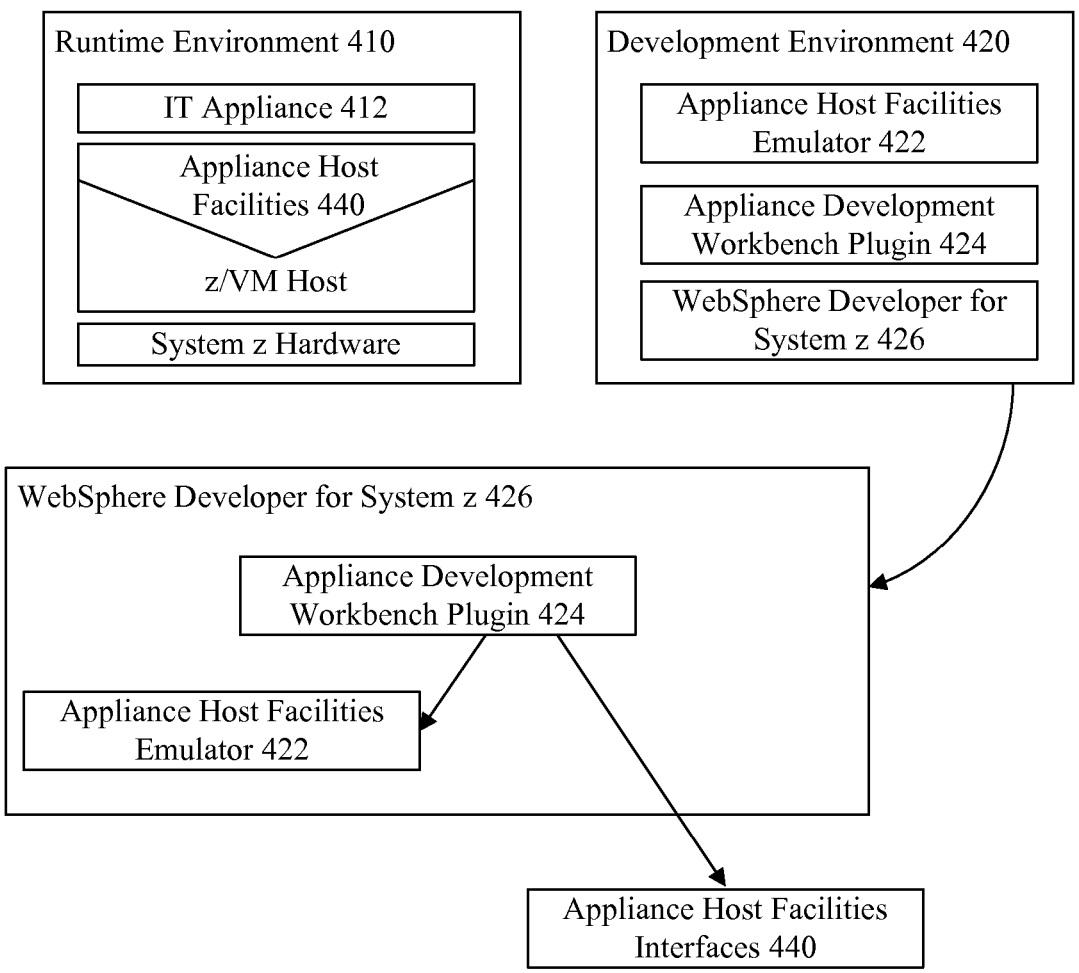
FIG. 4 is a schematic diagram illustrating a system for providing development support enabling virtualizing an IT appliance in accordance with an embodiment of the inventive arrangements disclosed herein.

FIG. 4 is a schematic diagram illustrating a system 400 for providing development support enabling virtualizing an information technology (IT) appliance in accordance with an embodiment of the inventive arrangements disclosed herein. System 400 can be present in the context of system 100. In system 400, a development environment 420 can facilitate the generation of an appliance able to execute within a runtime environment 410. The environment 420 can be executed within a system having a runtime environment 410.

Development environment 420 can enable rapid appliance 412 development and testing through modular development tools. Environment 420 can include components 422-426, which can operate cooperatively to assist appliance developers. Component 426 can be an optional component of environment 420. In one embodiment, WEBSPHERE developer for SYSTEM Z 426 can interact with plug-in 424 and emulator 422 to enable appliance development. Component 426 can permit component 424 to communicate with existing host facilities 440 interfaces.

Appliance host facilities emulator 422 can be an executing environment able to replicate runtime environment 410. During development and testing appliance 412 can be executed within emulator 422. Emulator 422 can permit appliance 412 to behave identically to execution within framework 410, enabling development to be performed without deployment on environment 410. Emulator 422 can be a constituent of component 426. In one embodiment, emulator 422 can be a module associated with WEBSPHERE DEVELOPER WORKBENCH plug-in 424.

Plug-in 424 can be a development tool able to provide environment 420 with host facility functionality. Plug-in 424 can include a software development kit (SDK), export tools, deployment tools, and the like. The plug-in 424 can utilize exposed host facility functionality to interact with debugging interface. Plug-in 424 can employ local testing environments such as emulator 422 without incurring the overhead cost of a host operating system. In one embodiment, plug-in 424 can be a WEBSPHERE module available to a development workbench.

Drawings presented herein are for illustrative purposes only and should not be construed to limit the invention in any regard. System 400 can illustrate an embodiment using WEBSPHERE but can be expanded and/or modified to include other development platforms/environments. Although presented as a plug-in architecture, components 422-426 can be non-modular portions of a development tool.

The flowchart and block diagrams in the FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for virtualizing information technology (IT) appliances comprising a non-transitory computer readable storage medium having computer usable program code embodied therewith, the computer usable program code comprising:

IT appliance hosting facilities software implemented at a layer of abstraction above a host for a virtual machine operating system, which is implemented in a layer of abstraction above hardware, where the IT appliance hosting facilities software comprises programmatic code functioning as virtualized hardware upon which a plurality of IT appliance software modules are able to concurrently run, wherein the IT appliance hosting facilities software layer is configured to provide caching, application level security, and a standardized framework for running the plurality of IT appliance software modules configured in conformance with the standardized framework, wherein said IT appliance hosting facilities software comprises:

an appliance runtime environment configured to abstract host system details from IT appliance software modules, wherein the appliance runtime environment is completely dependent upon resources of the host; and platform support configured to provide a plurality of services specific to said IT appliance hosting facilities that are able to be invoked by components of the appliance runtime environment, wherein the appliance runtime environment comprises a plurality of discrete components to interact with the IT appliance software modules, said components comprising an administrative interface; a debugging and profiling interface; an appliance interface; an operational interface; system appliance-level macros, user-defined appliance-level macros, a macros appliance instance manager, a security manager, an inter-appliance communication area; a host resources manager, and an operational manager.

2. The computer program product of claim 1, wherein each IT appliance software module is functionally equivalent to a corresponding non-virtualized IT appliance excepting that hardware of the corresponding non-virtualized IT appliance is replaced by the virtualized hardware provided by the IT appliance hosting facilities software, wherein the non-virtualized IT appliance is a specialized device comprising optimized hardware and software designed for handling a discrete set of infrastructure tasks for a computing environment.

3. A virtualized IT appliance software module stored in a storage medium comprising: computer usable program code configured to be executed by virtualized hardware provided by IT appliance hosting facilities software, wherein the computer usable program code comprises an IT appliance software module stored in a discrete logical partition of a storage medium, wherein the IT appliance software module is functionally equivalent to a corresponding non-virtualized IT appliance excepting that hardware of the corresponding non-virtualized IT appliance is replaced by the virtualized hardware provided by the IT appliance hosting facilities software, wherein the non-virtualized IT appliance is a specialized device comprising optimized hardware and software designed for handling a discrete set of infrastructure tasks for a computing environment, wherein said IT appliance software module is configured to communicate through the IT appliance hosting facilities software with other IT appliance software modules concurrently executing on top of the IT appliance hosting facilities software.

4. The virtualized IT appliance software module of claim 3, wherein the IT appliance hosting facilities software is implemented at a layer of abstraction above a virtual machine host, which is implemented in a layer of abstraction above a hardware layer of a computing system, wherein the IT appliance hosting facilities software is configured to provide caching, application level security, and an standardized framework for running the plurality of IT appliance software modules comprising said IT appliance software module.

5. The virtualized IT appliance software module of claim 4, wherein said IT appliance software module is configured to communicate through the IT appliance hosting facilities software with at least one virtualized operating systems executing on top of the virtual machine host.

6. The virtualized IT appliance software module of claim 4, wherein the virtual machine host is a virtual machine operating system.

* * * * *